US010825047B2

(12) United States Patent
Vorozhtsov

(10) Patent No.: US 10,825,047 B2
(45) Date of Patent: Nov. 3, 2020

(54) APPARATUS AND METHOD OF SELECTION AND PLACEMENT OF TARGETED MESSAGES INTO A SEARCH ENGINE RESULT PAGE

(71) Applicant: YANDEX EUROPE AG, Lucerne (CH)

(72) Inventor: Artem Viktorovich Vorozhtsov, Khimki (RU)

(73) Assignee: YANDEX EUROPE AG, Lucerne (CH)

( * ) Notice: Subject to any disclaimer, the term of this patent is extended or adjusted under 35 U.S.C. 154(b) by 289 days.

(21) Appl. No.: 15/108,407

(22) PCT Filed: Nov. 11, 2014

(86) PCT No.: PCT/IB2014/065965
§ 371 (c)(1),
(2) Date: Jun. 27, 2016

(87) PCT Pub. No.: WO2015/170149
PCT Pub. Date: Nov. 12, 2015

(65) Prior Publication Data
US 2016/0321694 A1  Nov. 3, 2016

(30) Foreign Application Priority Data
May 7, 2014 (RU) .............................. 2014118337

(51) Int. Cl.
*G06Q 30/02* (2012.01)
*G06F 16/9535* (2019.01)
*G06F 16/2457* (2019.01)

(52) U.S. Cl.
CPC ... *G06Q 30/0256* (2013.01); *G06F 16/24578* (2019.01); *G06F 16/9535* (2019.01); *G06Q 30/02* (2013.01)

(58) Field of Classification Search
CPC .. G06Q 30/02; G06Q 30/256; G06F 16/9535; G06F 16/24578
See application file for complete search history.

(56) References Cited

U.S. PATENT DOCUMENTS 7,363,302 B2   4/2008  Lester
8,595,067 B2  11/2013  Baluja
(Continued)

FOREIGN PATENT DOCUMENTS

EA    016427 A1   2/2012
RU  2442213 C2   2/2012

OTHER PUBLICATIONS

Yang, Sha. "Analyzing the Relationship between Organic and Sponsored Search Advertising: Positive, Negative, or Zero Interdependence?" Marketing Science : The Marketing Journal of the Institute for Operations Research and the Management Sciences 29.4 (2010). (Year: 2010).*
(Continued)

Primary Examiner — Katherine Kolosowski-Gager
(74) Attorney, Agent, or Firm — BCF LLP

(57) ABSTRACT

A computer-implemented method of presenting a search engine result page to a user on an electronic device, the method comprising: receiving a search query; generating a search query result set (SQRS); based on the search query, determining a relevance factor of the SQRS; generating a search engine result page, the search engine result page including the SQRS and a targeted message, the targeted message having been selected by the server by executing the steps of: responsive to the relevance factor of the SQRS being equal or exceeding to a threshold, selecting the targeted message from a first plurality of targeted messages; otherwise selecting the targeted message from a second plurality of targeted messages; the both pluralities containing distinct targeted messages that have been grouped in
(Continued)

accordance with a targeting parameter; transmitting to the electronic device the search engine result page.

16 Claims, 5 Drawing Sheets

(56) References Cited

U.S. PATENT DOCUMENTS

| | | |
|---|---|---|
| 8,798,986 B2 | 8/2014 | Nash et al. |
| 2008/0082518 A1* | 4/2008 | Loftesness ........ G06F 17/30979 |
| 2008/0275863 A1* | 11/2008 | Dominowska ......... G06Q 30/02 |
| 2011/0022623 A1 | 1/2011 | Davis et al. |
| 2011/0191168 A1* | 8/2011 | Schroedl ............ G06Q 30/0246 |
| | | 705/14.45 |
| 2011/0264511 A1 | 10/2011 | Zhang |
| 2011/0270672 A1* | 11/2011 | Hillard .................. G06Q 30/02 |
| | | 705/14.42 |
| 2012/0158702 A1* | 6/2012 | Kumar .............. G06F 17/30303 |
| | | 707/723 |
| 2012/0259702 A1* | 10/2012 | Zhang ................ G06Q 30/0277 |
| | | 705/14.54 |
| 2013/0110829 A1 | 5/2013 | Zhou |

OTHER PUBLICATIONS

Xu, Lizhen, et al. "Effects of the Presence of Organic Listing in Search Advertising." Information Systems Research, vol. 23, No. 4, 2012, pp. 1284-1302. JSTOR, www.jstor.org/stable/42004257. Accessed Sep. 12, 2020. (Year: 2012).*

International Search Report from PCT/IB2014/065965, Lee W. Young, dated Apr. 10, 2015.

* cited by examiner

APPARATUS AND METHOD OF SELECTION AND PLACEMENT OF TARGETED MESSAGES INTO A SEARCH ENGINE RESULT PAGE

CROSS-REFERENCE

The present application claims priority to Russian Patent Application No. 2014118337, filed May 7, 2014, entitled "APPARATUS AND METHOD OF SELECTION AND PLACEMENT OF TARGETED MESSAGES INTO A SEARCH ENGINE RESULT PAGE" the entirety of which is incorporated herein.

FIELD

The present technology relates to search engines in general, and to an apparatus and method of selection and placement of targeted messages into a search engine result page.

BACKGROUND

In targeting, such as behavioral targeting, historical information such as online user behavior information can be used in targeting high-performing advertisements and other targeted messages to users. A machine learning-based model may be utilized in selecting targeted messages for matching with serving opportunities and for serving to particular users. Historical user behavior information may be used to train the model offline. For example, such models may be trained periodically, such as monthly, weekly, or even more frequently, using updated historical user behavior information. Online, the offline-trained model may be utilized in advertisement targeting and in determining or facilitating determination of such things as serving thresholds.

The technology described in the US patent US 20110264511 A1 provides "techniques for use in association with online advertising, relating to use of serving thresholds, associated with predicted click through rates, and delivery policies, associated with advertising inventory serving and distribution. An offline-trained machine learning-based model may be utilized in advertising serving decision-making in connection with serving opportunities. However, serving thresholds and delivery policies, for use in association with the model in serving decision-making, may be adjusted online, such as in real-time or near real-time, based on information obtained online affecting factors such as predicted click through rates and advertising inventory distribution".

SUMMARY

It is an object of the present technology to ameliorate at least some of the inconveniences present in the prior art.

In one aspect, implementations of the present technology provide a computer-implemented method of presenting a search engine result page to a user on an electronic device, the method executable at a server, the method comprising: receiving, over a communication network from the electronic device, a search query; responsive to the search query, generating a search query result set; based on the search query, determining a relevance factor of the search query result set, the relevance factor of the search query result set indicative of a likelihood parameter that the search query result set satisfies user intent; generating the search engine result page, the search engine result page including the search query result set and a targeted message, the targeted message having been selected by the server by executing the steps of: responsive to the relevance factor of the search query result set being one of: equal to a relevancy threshold and above the relevancy threshold, selecting the targeted message from a first plurality of targeted messages; responsive to the relevance factor of the search query result set being below the relevancy threshold, selecting the targeted message from a second plurality of targeted messages; the first plurality of targeted messages and the second plurality of targeted messages containing distinct targeted messages that have been grouped in accordance with a targeting parameter; transmitting to the electronic device, over the communication network, the search engine result page.

In some implementations of the method, the method further comprises determining by the server a spatial placement of the targeted message by executing the steps of: responsive to the targeting parameter factor being one of: equal to a targeting parameter threshold and above the targeting parameter threshold, selecting a first spatial placement of the targeted message in the search engine result page; responsive to the targeting parameter factor being below the targeting parameter threshold, selecting a second spatial placement of the targeted message in the search engine result page. Generally speaking, the spatial placement is an area designated for placement of targeted messages. The area designated for placement of targeted messages can be located in any part of the search engine result page. For sake of example, the area designated for placement of targeted messages can be located at the top of the search engine result page, at the bottom of the search engine result page, in right side of the search engine result page, in the center of the search engine result page, and so on.

In some implementations of the method, the area designated for placement of targeted messages can be shaped to be suitable for location of targeted messages of a particular size and shape. The area designated for placement of targeted messages can be also shaped to be suitable for location of targeted messages of any size and shape within predetermined limits. For example, the area designated for placement of targeted messages can be suitable for locating oval, vertical rectangular, horizontal rectangular, square targeted messages, as well as targeted messages of any other shape. In some embodiments, the area designated for placement of targeted messages can be suitable for locating of targeted messages being a web banner, a frame ad, a pop-up, a pop-under, a floating ad, an expanding ad advertising, a button advertisement, a pop-up advertising, a mobile advertising, and so on.

For better understanding and as a non-limiting example, a relevance factor of a search query can be below the relevancy threshold. In this case, one or several targeted messages can be selected from the second plurality of targeted messages. The server can then select, based on their respective targeting parameters and based on targeting parameter threshold, the first spatial placement and/or on the second spatial placement for the respectively selected one or several targeted messages.

Alternatively, some implementations of the present technology provide the computer-implemented method, the method further comprising determining by the server a spatial placement of the targeted message by executing the steps of: responsive to the relevance factor of the search query result set being one of: equal to a relevancy threshold and above the relevancy threshold, selecting a first spatial placement of the targeted message in the search engine result page; responsive to the relevance factor of the search query result set being below the relevancy threshold, selecting a second spatial placement of the targeted message in the search engine result page. Spatial placements can be effected in any part of the search engine result page. For sake of example, spatial placement can be effected at the top of the search engine result page, at the bottom of the search engine result page, in right side of the search engine result page, in the center of the search engine result page, and so on.

In some implementations of the method, the area designated for placement of targeted messages can be shaped to be suitable for location of targeted messages of a particular size and shape. The area designated for placement of targeted messages can be also shaped to be suitable for location of targeted messages of any size and shape within predetermined limits. For example, the area designated for placement of targeted messages can be suitable for locating oval, vertical rectangular, horizontal rectangular, square targeted messages, as well as targeted messages of any other shape. In some embodiments, the area designated for placement of targeted messages can be suitable for locating of targeted messages being a web banner, a frame ad, a pop-up, a pop-under, a floating ad, an expanding ad advertising, a button advertisement, a pop-up advertising, a mobile advertising, and so on.

The targeted message in the present technology is a message which is selected by a server in response to a search query or a search query and information representative of the user performing the search query. The targeted message is different and distinct from the information organically presented within the search engine result page (such as information located through general and/or vertical searches that are responsive to the search query). For example, the Boxing Day sales announcement of the retailer Walmart found by a server in the course of performing the general web search is not generally considered a targeted message within the sense of the present disclosure, but is rather considered to be part of the search engine result set. More specifically, a hyperlink to that announcement along with a short description is rather an element of the search engine result set, the search engine result set being a part of the search engine result page. However, the Boxing Day sales announcement banner of the retailer Walmart found by the server in an advertisement database is a targeted message. Within the latter example, the Boxing Day sales announcement banner has been provisioned by Walmart (or an ad agency, on its behalf), the provisioning having been done in accordance with the rules and policies of an operator of the server. How the targeted messages are selected based on the search query and/or information representative of the user performing the search query is generally known in the art and will not be described here at any length.

Some implementations of the present technology provide the computer-implemented method, the targeted message comprises a digital ad. The digital ad include any type of display advertisement, including web banner, frame ad, pop-up, pop-under, floating ad, expanding ad advertising, button advertisement, pop-up advertising, mobile advertising, static ad, rich media display ad, text ad, and others.

In some implementations of the present technology, the targeted message can be of other types, such as a weather forecast and the like. Generally speaking, the targeted messages can contain a text, an image, a video, animations, buttons, forms, hyperlinks, interactive elements, or a combination thereof.

Within some implementations of the present technology, the targeting parameter is used for organizing targeted messages into different groups. Targeting messages can be divided into two or more groups.

In some implementations of the present technology, the targeting parameter comprises an actual click-through rate of the targeted message. The click-through rate of the targeted message is defined as the number of clicks on the targeted message divided by the number of times the targeted message has been shown. The actual click-through rate of the targeted message is used when targeted message has been already previously displayed to users and when server possess actual data with regard to the number of times the targeted message has been shown and number of clicks on the targeted message.

In some embodiments, while calculating the click-through rates the number of times a given targeted message has been shown on a search engine result page is taken into account. In other embodiments, while calculating the click-through rates the number of times a given targeted message has been shown on a web page other than a search engine result page is taken into account. In yet further embodiments, while calculating the click-through rates the number of times a given targeted message has been shown on both a search engine result page and other web pages is taken into account.

Examples of the other web sites on which the targeted message can be placed and which web sites can be used as basis for calculating the click through rate will now be provided. For illustrative example, some targeted messages have been previously displayed on web pages other than search engine result pages. The pages other than search engine result pages can be web interfaces of web mail clients, where web mail service provider places targeted messages; an other example can be a web page of an online magazine, a company web site, a personal web site where a free of charge hosting provider places targeted messages, and so on. It is possible therefore calculating the actual click-through rate of the targeted message.

In some implementations, a given targeted message may have already been displayed on a search engine result page. Within these implementations, it is possible to calculate the actual click-through rate of the targeted message using the number of times the given targeted message has been displayed on the search engine result page. Hence, in these implementations, the actual click-through rate is established based on information representative of the number of clicks on the targeted message and the number of times the targeted message has been shown on search engine result pages, the search engine result pages generated in response to receiving search queries from users.

In other implementations, a given targeted message may have been previously displayed on both search engine result pages and on web pages other than search engine result pages. Hence, it is possible to calculate the actual click-through rate of the targeted message using the number of times the given targeted message has been displayed on the search engine result page and the web page other than the search engine result page. Hence, in these implementations, the actual click-through rate is established based on information representative of the number of clicks on the targeted message and the number of times the targeted message has been shown on pages other than search engine result pages. As non-limiting examples, displaying on partner web sites, or displaying on web e-mail clients can be taken into account. In some implementations, both the number of times the targeted message has been shown on search engine result pages and the number of times the targeted message has been shown on pages other than search engine result pages can be taken into account for establishing the actual click-through rate of the targeted message.

In some implementations of the present technology, the targeting parameter comprises a predicted click-through rate of the targeted message. The predicted click-through rate of the targeted message can be used in the case when the server does not possess actual click-through rate for the given targeted message. This can be a case when the targeted message is new and it has never been displayed. The predicted click-through rate of the targeted message can be also used when a given targeted message has not been displayed enough times to enable collection of statistically significant values for the number of clicks and number of views of the given targeted message. In the latter case, the predicted click-through rate of the targeted message can be calculated by the server based on actual click through rates related to similar targeted messages. The actual click-through rate of the targeted message can also be taken into account for calculating the predicted click-through rate of the targeted message. For example, the existing actual click-through rate of the targeted message can be taken into account if there were insignificant number of times the targeted message was shown. While the actual click-through rate in this scenario would not be statistically significant, the actual click-through rate nevertheless could be considered as one of factors while calculating the predicted click-through rate of the targeted message.

In some implementations of the present technology, the targeting parameter comprises a bid price associated with the targeted message. The bid price associated with the targeted message is the maximum cost-per-click (CPC) or, in other words, a maximum price payable by an entity associated with the targeted message for a user clicking on the targeted message. For example, the targeted messages having the maximum cost-per-click equal or above the pre-programmed value, can be attributed to the first group of targeted messages, and the targeted messages having the maximum cost-per-click below the pre-programmed value, can be attributed to the second group of targeted messages.

In other implementations of the present technology, the targeting parameter can be implemented differently or can include a combination of some or all, as well as different, targeting parameters described above.

Non-limiting examples of the threshold for the targeting parameter include: a bid price for cost-per-click targeting parameter, for example 0.22 USD; a threshold expressed as a percentage for click-through rate targeting parameter, for example 1.3 percent; a distance in miles for distance targeting parameter, for example 8 miles; etc. Threshold for the targeting parameter can also be an abstract numeric value. Such an abstract numeric value can be used in those implementations, where the targeting parameter is a combination of several targeting parameters, represented as a numeric value and, hence, the targeting parameters threshold can also be calculated using the abstract numeric value.

In the context of the present specification, the expression "relevance factor of the search query result set" shall mean the likelihood that the search query result set will satisfy the user's search intent.

The relevance factor of the search query result set can be calculated by a server by evaluating behaviour of users in response to displaying search engine result sets within search engine result pages, the search engine result sets previously generated in response to the same or substantially same search queries of different users. The same or substantially same search queries of the same user can be treated as the same or substantially same search queries of different users, if these queries were made in the course of different sessions of a web browser.

In some implementations of the present technology, the relevance factor of the search query result set can be the relevance factor of the last displayed search query result set. Evaluation of the relevance factor of the search query result set can be cumulative. It means that following reception of each consequential search query, the consequential search query being the same or substantially the same to the previous search query, the server calculates the relevance factor of the second search query result set taking into account behaviour of users responsive to both displaying the first search query result set and displaying the first search query result set.

Two and more search queries are substantially the same when a particular search engine would render exactly the same search engine result sets in response to these search queries provided that all other parameters, besides search queries, would be the same. For example, search queries "he and she" and "she and he" without quotation marks can be substantially similar.

For sake of better explanation, the relevance factor of the search query result set can be calculated by the server by executing a computer-implemented method comprising following steps: a) receiving a search query from a first electronic device; b) generating a first search query result set in response to the receiving of the search query; c) sending the first search query result set to the first electronic device; d) receiving, from the first electronic device, an indication of a user interaction with the first search engine result page, the first search engine result page containing the first search query result set; e) based on the indication of the user interaction, determining a relevancy factor of the first search query result set, the first search query result set generated in response to the search query; f) attributing a relevancy factor to the search query; g) responsive to receiving the same or substantially similar search query from the second electronic device, generating a next search query result set; h) sending the second search query result set to the electronic device; i) receiving, from the electronic device, an indication of a user interaction with the next search engine result page, the next search engine result page containing the next search query result set; j) determining a relevancy factor of the next search query result set, the next search query result set generated in response to the search query; k) reattributing a relevancy factor to the search query, the relevancy factor of the search query based on the relevancy factor of the first search query result set and the next search query result set, the first search query result set and the next search query result set are generated in response to the same search query or in response to substantially same search queries; l) repetition of steps "g)" to "l)".

In the context of the present specification, the expression "an indication of a user interaction" shall mean data with regard to the user activity in response to displaying a search engine result set within the search engine result page, the user activity demonstrating the relevance of the search query result set. As a non-limiting example, the user interaction can indicate a high relevancy factor of the search engine result set: the user has clicked on a search result located within the top ten results within a given search engine result set, and after exploring the clicked resource, the user has not returned to the search engine result set page.

As another non-limiting example, the user interaction can indicate a low relevancy factor of the search engine result set: the user switches from the search engine result page displaying the first ten search results to the search engine result page displaying the second ten search results; and then, optionally, the user switches to the search engine result page displaying third ten search results to the search engine result page. As one more non-limiting example, the following user interaction can also indicate a low relevancy factor of the search engine result set: the user clicks on a hyperlink in the search engine result page, the hyperlink being a part of the search query result set, and after visiting the web page associated with the hyperlink, quickly returns back to the search engine result page.

In some implementations of the present technology, the threshold for the relevance factor of the search query result set is pre-determined by the server.

In some implementations of the present technology, the computer-implemented method further comprises calculating the threshold for the relevance factor of the search query result set. Calculating the relevancy factor threshold can comprise computing the relevancy factor threshold based on a category of the search query. Put another way, different categories of the search queries may be associated with different respective relevancy factor threshold. In some implementations of the present technology, the search query is a first search query of a first category and the step of computing the threshold comprises computing a different threshold relative to another threshold associated with a second search query of a second category.

In another aspect, implementations of the present technology provide a computer-implemented method of presenting a search engine result page to a user on an electronic device, the method executable at a server, the method comprising: receiving, over a communication network from the electronic device, a search query; responsive to the search query, generating a search query result set; selecting a targeted message; based on the search query, determining a relevance factor of the search query result set, the relevance factor of the search query result set indicative of a likelihood parameter that the search query result set satisfies user intent; generating the search engine result page, the search engine result page including the search query result set and a targeted message, the spatial placement of the targeted message having been determined by the server by executing the steps of: responsive to the relevance factor of the search query result set being one of: equal to a threshold and above the threshold, selecting a first spatial placement of the targeted message in the search engine result page; responsive to the relevance factor of the search query result set being below a threshold, selecting a second spatial placement of the targeted message in the search engine result page; transmitting to the electronic device, over the communication network, the search engine result page.

Some implementations of the present technology further provide the computer-implemented method, the method further comprising selecting by the server the targeted message, the selecting by the server by executing the steps of: responsive to the targeting parameter factor being one of: equal to a threshold and above the threshold, selecting the targeted message from a first plurality of targeted messages; responsive to the targeting parameter factor being below a threshold, selecting the targeted message from a second plurality of targeted messages; the first plurality of targeted messages and the second plurality of targeted messages containing distinct targeted messages that have been grouped in accordance with at least one common targeting parameter.

Non-limiting examples of the threshold for the targeting parameter include: a bid price for cost-per-click targeting parameter, for example 0.22 USD; a threshold expressed as a percentage for click-through rate targeting parameter, for example 1.3 percent; a distance in miles for distance targeting parameter, for example 8 miles; etc. Threshold for the targeting parameter can also be an abstract numeric value. Such an abstract numeric value can be used in those implementations, where the targeting parameter is a combination of several targeting parameters, represented as a numeric value and, hence, the targeting parameters threshold can also be calculated using the abstract numeric value.

Alternatively, some implementations of the present technology further provide the computer-implemented method, the method further comprising selecting by the server the targeted message, the selecting by the server by executing the steps of: responsive to the relevancy factor of the search query result set being one of: equal to a threshold and above the threshold, selecting the targeted message from a first plurality of targeted messages; responsive to the relevancy factor of the search query result set being below a threshold, selecting the targeted message from a second plurality of targeted messages; the first plurality of targeted messages and the second plurality of targeted messages containing distinct targeted messages that have been grouped in accordance with at least one common targeting parameter.

The targeted message in the present technology is a message which is selected by a server in response to a search query and/or information representative of the user performing the search query. The targeted message is different and distinct from the information organically presented within the search engine result page (such as information located through general and/or vertical searches that are responsive to the search query). For example, the Boxing Day sales announcement of the retailer Walmart found by a server in the course of performing the general web search is not generally considered a targeted message within the sense of the present disclosure, but is rather considered to be part of the search engine result page. More specifically, a hyperlink to that announcement along with a short description is rather an element of the search engine result set, the search engine result set being a part of the search engine result page. However, the Boxing Day sales announcement banner of the retailer Walmart found by the server in an advertisement database is a targeted message. Within the latter example, the Boxing Day sales announcement banner has been provisioned by Walmart (or an ad agency, on its behalf), the provisioning having been done in accordance with the rules and policies of an operator of the server. How the targeted messages are selected based on the search query and/or information representative of the user performing the search query is generally known in the art and will not be described here at any length.

Some implementations of the present technology provide the computer-implemented method, the targeted message comprises a digital ad. The digital ad include any type of display advertisement, including web banner, frame ad, pop-up, pop-under, floating ad, expanding ad advertising, button advertisement, pop-up advertising, mobile advertising, static ad, rich media display ad, text ad, and others.

In some implementations of the present technology, the targeted message can be of other types, such as a weather forecast and the like. Generally speaking, the targeted messages can contain a text, an image, a video, animations, buttons, forms, hyperlinks, interactive elements, or a combination of thereof.

Within some implementations of the present technology, the targeting parameter is used for organizing targeted messages into different groups. Targeting messages can be divided into two or more groups.

In some implementations of the present technology, the targeting parameter comprises an actual click-through rate of the targeted message. The click-through rate of the targeted message is defined as the number of clicks on the targeted message divided by the number of times the targeted message has been shown. The actual click-through rate of the targeted message is used when targeted message has been already previously displayed to users and when server possess actual data with regard to numbers of displaying and number of clicks on the targeted message.

In some implementations, the actual click-through rate is established based on information representative of the number of clicks on the targeted message and the number of times the targeted message has been shown on search engine result pages, the search engine result pages generated in response to receiving search queries from users.

In some implementations, the actual click-through rate is established based on information representative of the number of clicks on the targeted message and the number of times the targeted message has been shown on pages other than search engine result pages. As non-limiting examples, displaying on partner web sites, or displaying on web e-mail clients can be taken into account.

In some implementations, both the number of times the targeted message has been shown on search engine result pages and the number of times the targeted message has been shown on pages other than search engine result pages can be taken into account for establishing the actual click-through rate of the targeted message.

In some implementations of the present technology, the targeting parameter comprises a predicted click-through rate of the targeted message. The predicted click-through rate of the targeted message can be used in the case when the server does not possess actual click-through rate for the given targeted message. This can be a case when the targeted message is new and it has never been displayed. The predicted click-through rate of the targeted message can be also used when a given targeted message has not been displayed enough times to enable collection of statistically significant values for the number of clicks and number of views of the given targeted message. In the latter case, the predicted click-through rate of the targeted message can be calculated by the server based on actual click through rates related to similar targeted messages. The actual click-through rate of the targeted message can also be taken into account for calculating the predicted click-through rate of the targeted message. For example, the existing actual click-through rate of the targeted message can be taken into account if there were insignificant number of times the targeted message was shown. While the actual click-through rate in this scenario would not be statistically significant, the actual click-through rate nevertheless could be considered as one of factors while calculating the predicted click-through rate of the targeted message.

In some implementations of the present technology, the targeting parameter comprises a bid price associated with the targeted message. The bid price associated with the targeted message is the maximum cost-per-click (CPC) or, in other words, a maximum price payable by an entity associated with the targeted message for a user clicking on the targeted message. For example, the targeted messages having the maximum cost-per-click equal or above the pre-programmed value, can be attributed to the first group of targeted messages, and the targeted messages having the maximum cost-per-click below the pre-programmed value, can be attributed to the second group of targeted messages.

In other implementations of the present technology, the targeting parameter can be implemented differently or can include a combination of some or all, as well as different, targeting parameters described above.

Non-limiting examples of the threshold for the targeting parameter include: a bid price for cost-per-click targeting parameter, for example 0.22 USD; a threshold expressed as a percentage for click-through rate targeting parameter, for example 1.3 percent; a distance in miles for distance targeting parameter, for example 8 miles; etc. Threshold for the targeting parameter can also be an abstract numeric value. Such an abstract numeric value can be used in those implementations, where the targeting parameter is a combination of several targeting parameters, represented as a numeric value and, hence, the targeting parameters threshold can also be calculated using the abstract numeric value.

In the context of the present specification, the expression "relevance factor of the search query result set" shall mean the likelihood that the search query result set will satisfy the user's search intent.

The relevance factor of the search query result set can be calculated by a server by evaluating behaviour of users in response to displaying search engine result sets within search engine result pages, the search engine result sets generated in response to the same or substantially same search queries of different users. The same or substantially same search queries of the same user can be treated as the same or substantially same search queries of different users, if these queries were made in the course of different sessions of a web browser. In some implementations of the present technology, the relevance factor of the search query result set can be the relevance factor of the last displayed search query result set. Evaluation of the relevance factor of the search query result set can be cumulative. It means that following reception of each consequential search query, the consequential search query being the same or substantially the same to the previous search query, the server calculates the relevance factor of the second search query result set taking into account behaviour of users responsive to both displaying the first search query result set and displaying the first search query result set.

Two and more search queries are substantially the same when a particular search engine would render exactly the same search engine result sets in response to these search queries provided that all other parameters, besides search queries, would be the same. For example, search queries "he and she" and "she and he" without quotation marks can be substantially similar.

For sake of better explanation, the relevance factor of the search query result set can be calculated by the server by executing a computer-implemented method comprising following steps: a) receiving a search query from a first electronic device; b) generating a first search query result set in response to the receiving of the search query; c) sending the first search query result set to the first electronic device; d) receiving, from the first electronic device, an indication of a user interaction with the first search engine result page, the first search engine result page containing the first search query result set; e) based on the indication of the user interaction, determining a relevancy factor of the first search query result set, the first search query result set generated in response to the search query; f) attributing a relevancy factor to the search query; g) responsive to receiving the same or substantially similar search query from the second electronic device, generating a next search query result set; h) sending the second search query result set to the electronic device; i) receiving, from the electronic device, an indication of a user interaction with the next search engine result page, the next search engine result page containing the next search query result set; j) determining a relevancy factor of the next search query result set, the next search query result set generated in response to the search query; k) reattributing a relevancy factor to the search query, the relevancy factor of the search query based on the relevancy factor of the first search query result set and the next search query result set, the first search query result set and the next search query result set are generated in response to the same search query or in response to substantially same search queries; l) repetition of steps "g)" to "l)".

In the context of the present specification, the expression "an indication of a user interaction" shall mean data with regard to the user activity in response to displaying a search engine result set within the search engine result page, the user activity demonstrating the relevance of the search query result set. As a non-limiting example, the user interaction can indicate a high relevancy factor of the search engine result set: the user has clicked on a search result located within the top ten results within a given search engine result set, and after exploring the clicked resource, the user has not returned to the search engine result set page.

As another non-limiting example, the user interaction can indicate a low relevancy factor of the search engine result set: the user switches from the search engine result page displaying the first ten search results to the search engine result page displaying the second ten search results; and then, optionally, the user switches to the search engine result page displaying third ten search results to the search engine result page. As one more non-limiting example, the following user interaction can also indicate a low relevancy factor of the search engine result set: the user clicks on a hyperlink in the search engine result page, the hyperlink being a part of the search query result set, and after visiting the web page associated with the hyperlink, quickly returns back to the search engine result page.

In some implementations of the present technology, the threshold for the relevance factor of the search query result set is pre-determined by the server.

In some implementations of the present technology, the computer-implemented method further comprises calculating the threshold for the relevance factor of the search query result set. Calculating the relevancy factor threshold can comprise computing the relevancy factor threshold based on a category of the search query. Put another way, different categories of the search queries may be associated with different respective relevancy factor threshold. In some implementations of the present technology, the search query is a first search query of a first category and the step of computing the threshold comprises computing a different threshold relative to another threshold associated with a second search query of a second category.

In yet another aspect, implementations of the present technology provide a computer-implemented method for providing a search engine result page to a user on an electronic device, the electronic device having a user interface, the method executable on the electronic device, the method comprising: receiving, over the communication network, from a server, the search engine result page, the search engine result page generated by the server, the search engine result page including: a search query result set, the search query result set generated by the server responsive to the search query, and a targeted message, the targeted message having been selected by the server by executing the steps of: responsive to a relevance factor of the search query result set being one of: equal to a relevancy threshold and above the relevancy threshold, selecting the targeted message from a first plurality of targeted messages; responsive to the relevance factor of the search query result set being below the relevancy threshold, selecting the targeted message from a second plurality of targeted messages; the relevance factor of the search query result set is based on the search query, the relevance factor of the search query result set being indicative of a likelihood parameter that the search query result set satisfies user intent, and the first plurality of targeted messages and the second plurality of targeted messages containing distinct targeted messages that have been grouped in accordance with a targeting parameter.

In some implementations of the method, the method further comprises determining by the server a spatial placement of the targeted message by executing the steps of: responsive to the targeting parameter factor being one of: equal to a targeting parameter threshold and above the targeting parameter threshold, selecting a first spatial placement of the targeted message in the search engine result page; responsive to the targeting parameter factor being below the targeting parameter threshold, selecting a second spatial placement of the targeted message in the search engine result page. Generally speaking, the spatial placement is an area designated for placement of targeted messages. The area designated for placement of targeted messages can be located in any part of the search engine result page. For sake of example, the area designated for placement of targeted messages can be located at the top of the search engine result page, at the bottom of the search engine result page, in right side of the search engine result page, in the center of the search engine result page, and so on.

The area designated for placement of targeted messages can be shaped to be suitable for location of targeted messages of a particular size and shape. The area designated for placement of targeted messages can also be shaped to be suitable for location of targeted messages of any size and shape within predetermined limits. For example, the area designated for placement of targeted messages can be suitable for locating oval, vertical rectangular, horizontal rectangular, square targeted messages, as well as targeted messages of any other shape. In some embodiments, the area designated for placement of targeted messages can be suitable for locating of targeted messages being a web banner, a frame ad, a pop-up, a pop-under, a floating ad, an expanding ad advertising, a button advertisement, a pop-up advertising, a mobile advertising, and so on.

Alternatively, some implementations of the present technology provide the described above computer-implemented method, the method further comprising determining by the server a spatial placement of the targeted message by executing the steps of: responsive to the relevance factor of the search query result set being one of: equal to a relevancy threshold and above the relevancy threshold, selecting a first spatial placement of the targeted message in the search engine result page; responsive to the relevance factor of the search query result set being below the relevancy threshold, selecting a second spatial placement of the targeted message in the search engine result page.

Generally speaking, the spatial placement is an area designated for placement of targeted messages. The area designated for placement of targeted messages can be located in any part of the search engine result page. For sake of example, the area designated for placement of targeted messages can be located at the top of the search engine result page, at the bottom of the search engine result page, in right side of the search engine result page, in the center of the search engine result page, and so on.

The area designated for placement of targeted messages can be shaped to be suitable for location of targeted messages of a particular size and shape. The area designated for placement of targeted messages can also be shaped to be suitable for location of targeted messages of any size and shape within predetermined limits. For example, the area designated for placement of targeted messages can be suitable for locating oval, vertical rectangular, horizontal rectangular, square targeted messages, as well as targeted messages of any other shape. In some embodiments, the area designated for placement of targeted messages can be suitable for locating of targeted messages being a web banner, a frame ad, a pop-up, a pop-under, a floating ad, an expanding ad advertising, a button advertisement, a pop-up advertising, a mobile advertising, and so on.

The targeted message in the present technology is a message which is selected by a server in response to a search query and/or information representative of the user performing the search query. The targeted message is different and distinct from the information organically presented within the search engine result page (such as information located through general and/or vertical searches that are responsive to the search query). For example, the Boxing Day sales announcement of the retailer Walmart found by a server in the course of performing the general web search is not generally considered a targeted message within the sense of the present disclosure, but is rather considered to be part of the search engine result page. More specifically, a hyperlink to that announcement along with a short description is rather an element of the search engine result set, the search engine result set being a part of the search engine result page. However, the Boxing Day sales announcement banner of the retailer Walmart found by the server in an advertisement database is a targeted message. Within the latter example, the Boxing Day sales announcement banner has been provisioned by Walmart (or an ad agency, on its behalf), the provisioning having been done in accordance with the rules and policies of an operator of the server. How the targeted messages are selected based on the search query and/or information representative of the user performing the search query is generally known in the art and will not be described here at any length.

Some implementations of the present technology provide the computer-implemented method, the targeted message comprises a digital ad. The digital ad can include any type of advertisement, including web banner, frame ad, pop-up, pop-under, floating ad, expanding ad advertising, button advertisement, pop-up advertising, mobile advertising, static ad, rich media display ad, text ad, and others.

In some implementations of the present technology, the targeted message can be of other types, such as a weather forecast and the like. Generally speaking, the targeted messages can contain a text, an image, a video, animations, buttons, forms, hyperlinks, interactive elements, or a combination of thereof.

Targeting parameter in the present technology is a parameter used for organizing of targeted messages into different groups. Targeting messages can be divided into two or more groups. However, they can be divided in three and more groups.

In some implementations of the present technology, the targeting parameter comprises an actual click-through rate of the targeted message. The click-through rate of the targeted message is defined as the number of clicks on the targeted message divided by the number of times the targeted message has been shown. The actual click-through rate of the targeted message is used when targeted message has been already previously displayed to users and when server possess actual data with regard to numbers of displaying and number of clicks on the targeted message.

In some implementations, the actual click-through rate is established based on information representative of the number of clicks on the targeted message and the number of times the targeted message has been shown on search engine result pages, the search engine result pages generated in response to receiving search queries from users.

In some implementations, the actual click-through rate is established based on information representative of the number of clicks on the targeted message and the number of times the targeted message has been shown on pages other than search engine result pages. As non-limiting examples, displaying on partner web sites, or displaying on web e-mail clients can be taken into account.

In some implementations, both the number of times the targeted message has been shown on search engine result pages and the number of times the targeted message has been shown on pages other than search engine result pages can be taken into account for establishing the actual click-through rate of the targeted message.

In some implementations of the present technology, the targeting parameter comprises a predicted click-through rate of the targeted message. The predicted click-through rate of the targeted message can be used in the case when the server does not possess actual click-through rate for the given targeted message. This can be a case when the targeted message is new and it has never been displayed. The predicted click-through rate of the targeted message can be also used when a given targeted message has not been displayed enough times to enable collection of statistically significant values for the number of clicks and number of views of the given targeted message. In the latter case, the predicted click-through rate of the targeted message can be calculated by the server based on actual click through rates related to similar targeted messages. The actual click-through rate of the targeted message can also be taken into account for calculating the predicted click-through rate of the targeted message. For example, the existing actual click-through rate of the targeted message can be taken into account if there were insignificant number of times the targeted message was shown. While the actual click-through rate in this scenario would not be statistically significant, the actual click-through rate nevertheless could be considered as one of factors while calculating the predicted click-through rate of the targeted message.

In some implementations of the present technology, the targeting parameter comprises a bid price associated with the targeted message. The bid price associated with the targeted message is the maximum cost-per-click (CPC) or, in other words, a maximum price payable by an entity associated with the targeted message for a user clicking on the targeted message. For example, the targeted messages having the maximum cost-per-click equal or above the pre-programmed value, can be attributed to the first group of targeted messages, and the targeted messages having the maximum cost-per-click below the pre-programmed value, can be attributed to the second group of targeted messages.

In other implementations of the present technology, the targeting parameter can be implemented differently or can include a combination of some or all, as well as different, targeting parameters described above.

Non-limiting examples of the threshold for the targeting parameter include: a bid price for cost-per-click targeting parameter, for example 0.22 USD; a threshold expressed as a percentage for click-through rate targeting parameter, for example 1.3 percent; a distance in miles for distance targeting parameter, for example 8 miles; etc. Threshold for the targeting parameter can also be an abstract numeric value. Such an abstract numeric value can be used in those implementations, where the targeting parameter is a combination of several targeting parameters, represented as a numeric value and, hence, the targeting parameters threshold can also be calculated using the abstract numeric value.

In the context of the present specification, the expression "relevance factor of the search query result set" shall mean the likelihood that the search query result set will satisfy the user's search intent.

The relevance factor of the search query result set can be calculated by a server by evaluating behaviour of users in response to displaying search engine result sets within search engine result pages, the search engine result sets generated in response to the same or substantially same search queries of different users. The same or substantially same search queries of the same user can be treated as the same or substantially same search queries of different users, if these queries were made in the course of different sessions of a web browser. In some implementations of the present technology, the relevance factor of the search query result set can be the relevance factor of the last displayed search query result set. Evaluation of the relevance factor of the search query result set can be cumulative. It means that following reception of each consequential search query, the consequential search query being the same or substantially the same to the previous search query, the server calculates the relevance factor of the second search query result set taking into account behaviour of users responsive to both displaying the first search query result set and displaying the first search query result set.

Two and more search queries are substantially the same when a particular search engine would render exactly the same search engine result sets in response to these search queries provided that all other parameters, besides search queries, would be the same. For example, search queries "he and she" and "she and he" without quotation marks can be substantially similar.

For sake of better explanation, the relevance factor of the search query result set can be calculated by the server by executing a computer-implemented method comprising following steps: a) receiving a search query from a first electronic device; b) generating a first search query result set in response to the receiving of the search query; c) sending the first search query result set to the first electronic device; d) receiving, from the first electronic device, an indication of a user interaction with the first search engine result page, the first search engine result page containing the first search query result set; e) based on the indication of the user interaction, determining a relevancy factor of the first search query result set, the first search query result set generated in response to the search query; f) attributing a relevancy factor to the search query; g) responsive to receiving the same or substantially similar search query from the second electronic device, generating a next search query result set; h) sending the second search query result set to the electronic device; i) receiving, from the electronic device, an indication of a user interaction with the next search engine result page, the next search engine result page containing the next search query result set; j) determining a relevancy factor of the next search query result set, the next search query result set generated in response to the search query; k) reattributing a relevancy factor to the search query, the relevancy factor of the search query based on the relevancy factor of the first search query result set and the next search query result set, the first search query result set and the next search query result set are generated in response to the same search query or in response to substantially same search queries; l) repetition of steps "g)" to "l)".

In the context of the present specification, the expression "an indication of a user interaction" shall mean data with regard to the user activity in response to displaying a search engine result set within the search engine result page, the user activity demonstrating the relevance of the search query result set. As a non-limiting example, the user interaction can indicate a high relevancy factor of the search engine result set: the user has clicked on a search result located within the top ten results within a given search engine result set, and after exploring the clicked resource, the user has not returned to the search engine result set page.

As another non-limiting example, the user interaction can indicate a low relevancy factor of the search engine result set: the user switches from the search engine result page displaying the first ten search results to the search engine result page displaying the second ten search results; and then, optionally, the user switches to the search engine result page displaying third ten search results to the search engine result page. As one more non-limiting example, the following user interaction can also indicate a low relevancy factor of the search engine result set: the user clicks on a hyperlink in the search engine result page, the hyperlink being a part of the search query result set, and after visiting the web page associated with the hyperlink, quickly returns back to the search engine result page.

In some implementations of the present technology, the threshold for the relevance factor of the search query result set is pre-determined by the server.

In some implementations of the present technology, the computer-implemented method further comprises calculating the threshold for the relevance factor of the search query result set. Calculating the relevancy factor threshold can comprise computing the relevancy factor threshold based on a category of the search query. Put another way, different categories of the search queries may be associated with different respective relevancy factor threshold. In some implementations of the present technology, the search query is a first search query of a first category and the step of computing the threshold comprises computing a different threshold relative to another threshold associated with a second search query of a second category.

In yet another aspect, implementations of the present technology provide an electronic device. The electronic device comprise a user input interface for receiving user inputs. The electronic device further comprises a user output interface for providing at least one of visual and audible outputs to the user. The electronic device further comprises a network communication interface for two-way communication over a communications network. The electronic device further comprise a processor coupled to the user input interface, the user output interface and the network communication interface, the processor being configured to have access to computer readable commands which commands, when executed, cause the processor to execute: receiving, over the communication network, from a server, the search engine result page, the search engine result page generated by the server, the search engine result page including: a search query result set, the search query result set generated by the server responsive to the search query, and a targeted message, the targeted message having been selected by the server by executing the steps of: responsive to a relevance factor of the search query result set being one of: equal to a threshold and above the threshold, selecting the targeted message from a first plurality of targeted messages; responsive to the relevance factor of the search query result set being below the threshold, selecting the targeted message from a second plurality of targeted messages; the relevance factor of the search query result set is based on the search query, the relevance factor of the search query result set being indicative of a likelihood parameter that the search query result set satisfies user intent, and the first plurality of targeted messages and the second plurality of targeted messages containing distinct targeted messages that have been grouped in accordance with a targeting parameter.

In the context of the present specification, a communications network in some implementations of present technology can be implemented as the Internet. In other implementations of the present technology, the communications network can be implemented differently, such as any wide-area communications network, local-area communications network, a private communications network and the like.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as a electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "relevance factor of the search query result set" shall mean the likelihood that the user submitting the search query was intending to see data maintained within the search query result set.

In the context of the present specification, the expression "component" is meant to include software (appropriate to a particular hardware context) that is both necessary and sufficient to achieve the specific function(s) being referenced.

In the context of the present specification, the expression a "search query result set" is a listing of results returned by a search engine, which may encompass one or more general or specialized search modules, in response to a search query. Search query result set may contain a listing of results returned by a web search module, or by one or more vertical search modules, or by combination of results returned by web module and one or more vertical modules. The search query result set may also contain no results.

In the context of the present specification, the expression a "search engine result page" is a listing of results to be displayed to a client on an electronic device, the listing generated by combining a search query result set with targeted messages.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2A illustrates a web browser interface 106 being a combined user input interface and user output interface of the search application 104 of the electronic device 102 of the system 100 of FIG. 1.

DETAILED DESCRIPTION

Figure 1:
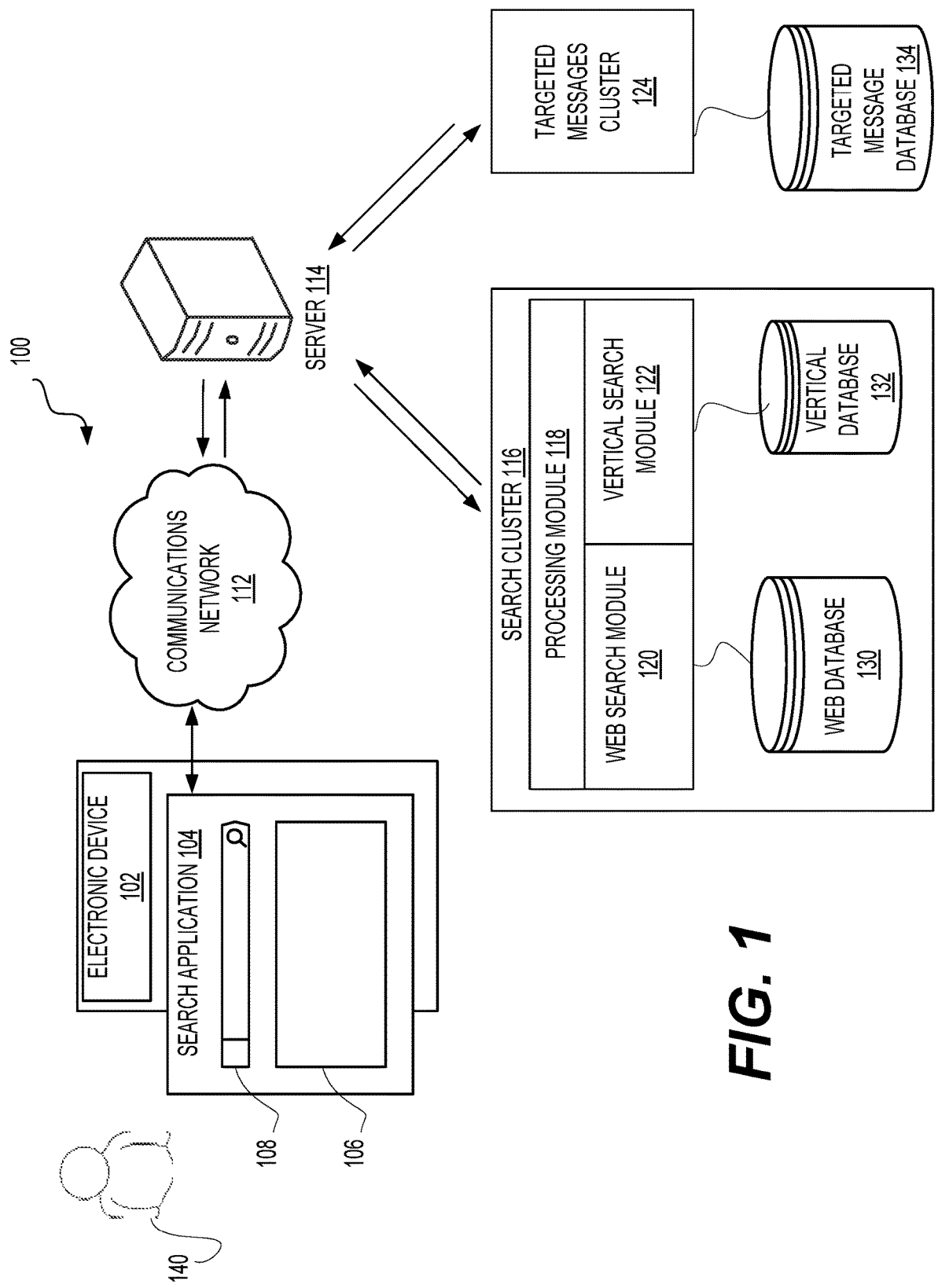
FIG. 1 is a schematic diagram showing a system 100 suitable for implementing embodiments of the present technology.

Referring to FIG. 1, there has been shown a diagram of a networked computer system 100. It is to be expressly understood that the computer system 100 is merely one possible implementation of the present technology. Thus, the description thereof that follows is intended to be only a description of illustrative examples of the present technology. This description is not intended to define the scope or set forth the bounds of the present technology. In some cases, what are believed to be helpful examples of modifications to computer system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the computer system 100 may provide in certain instances a simple implementation of the present technology, and that where such is the case they have been presented in this manner as an aid to understanding. As persons skilled in the art would understand, various implementations of the present technology may be of a greater complexity.

FIG. 1 illustrates a system 100 in accordance with one implementation of the present technology. The system 100 comprises an electronic device 102. The electronic device 102 is typically associated with a user 140 and, as such, can sometimes be referred to as a "client device". It should be noted that the fact that the electronic device 102 is associated with the user 140 does not need to suggest or imply any mode of operation—such as a need to log in, a need to be registered or the like.

The implementation of the electronic device 102 is not particularly limited, but as an example, the electronic device 102 may be implemented as a personal computer (desktops, laptops, netbooks, etc.), a wireless electronic device (a cell phone, a smartphone, a tablet and the like), as well as network equipment (a router, a switch, or a gateway). The general implementation of the electronic device 102 is known in the art and, as such, will not be described here at much length. Suffice it to say that the electronic device 102 comprises a user input interface (such as a keyboard, a mouse, a touch pad, a touch screen and the like) for receiving user inputs; a user output interface (such as a screen, a touch screen, a printer and the like) for providing visual or audible outputs to the user; a network communication interface (such as a modem, a network card and the like) for two-way communication over a communications network 112; and a processor coupled to the user input interface, the user output interface and the network communication interface, the processor being configured to execute various routines, including those described herein below. To that end the processor may store or have access to computer readable commands which commands, when executed, cause the processor to execute the various routines described herein.

The electronic device 102 comprises hardware and/or software and/or firmware (or a combination thereof), a search application 104. Generally speaking, the purpose of the search application 104 is to enable the user 140 to execute a search. How the search application 104 is implemented is not particularly limited. One example of the search application 104 may be embodied in a user accessing a web site associated with a search engine to access the search application 104 using a web browser. For example, the search application can be accessed by typing in an URL associated with Yandex search engine at www.yandex.ru into the web browser. It should be expressly understood that the search application 104 can be accessed using any other commercially available or proprietary search engine.

In alternative non-limiting embodiments of the present technology, the search application 104 may be implemented as a browser application on a portable device (such as a wireless communication device). For example (but not limited) to those implementations, where the electronic device 102 is implemented as a portable device, such as for example, Samsung™ Galaxy™ SIII, the electronic device may be executing a Yandex browser application. It should be expressly understood that any other commercially available or proprietary browser application can be used for implementing non-limiting embodiments of the present technology.

Generally, speaking, the search application 104 comprises a web browser interface 106 and an omnibox 108. The general purpose of the omnibox 108 is to enable the user 140 to enter her query or a "search string" or an URL associated with the web resource she is desirous of visiting. The general purpose of the web browser interface 106 is to provide search results that are responsive to the user query entered into the omnibox 108 or to display the web resource which URL is entered into the omnibox 108. How the user query is processed and how the search results are presented will be described in detail herein below.

Furthermore, the system 100 comprises the above-mentioned communications network 112. In some non-limiting embodiments of the present technology, the communications network 112 can be implemented as the Internet. In other embodiments of the present technology, the communications network 112 can be implemented differently, such as any wide-area communications network, local-area communications network, a private communications network and the like.

The system 100 comprises also a server 114 coupled to the communications network 112 via a communication link (not separately numbered). The server 114 can be implemented as a conventional computer server. In an example of an embodiment of the present technology, the server 114 can be implemented as a Dell™ PowerEdge™ Server running the Microsoft™ Windows Server™ operating system. Needless to say, the server 116 can be implemented in any other suitable hardware and/or software and/or firmware or a combination thereof. In the depicted non-limiting embodiment of present technology, the server 114 is a single server. In alternative non-limiting embodiments of the present technology, the functionality of the server 114 may be distributed and may be implemented via multiple servers.

The implementation of the server 114 is well known. However, briefly speaking, the server 114 comprises a communication interface (not depicted) structured and configured to communicate with various entities (such as the electronic device 102, for example and other devices potentially coupled to the communications network 112) via the communications network 112. The server 114 further comprises at least one computer processor (not depicted) operationally connected with the communication interface and structured and configured to execute various processes to be described herein.

In some embodiments, the server 114 can be operated by the same entity that has provided the afore-described search application 104. In alternative embodiments, the server 116 can be operated by an entity different from the one who has provided the afore-mentioned search application 104.

The server 114 is in communication with or otherwise coupled to a search cluster 116. Even though the server 114 has been shown coupled to the search cluster 116 via a dedicated communication link (not numbered), alternatively the server 114 can be coupled to the search cluster 116 via the communications network 112.

The search cluster 116 comprises a processing module 118. The processing module 118, in turn, includes a web search module 120 and a vertical search module 122. The web search module 120 has access to (or, otherwise, comprises) a web database 130. The vertical search module 122 has access to (or, otherwise, comprises) a vertical database 132.

Generally speaking the purpose of the search cluster 116 is to (i) conduct searches; (ii) execute analysis of search results and perform ranking of search results; (iii) group results and compile the search query result sets to be outputted to the electronic device 102 within search engine result pages. How the search cluster 116 is configured to execute searches is not particularly limited. Those skilled in the art will appreciate several ways and means to execute the search using the search cluster 116 and as such, several structural components of the search cluster 116 will only be described at a high level.

In some non-limiting embodiments of the present technology, the search cluster 116 comprises a processing module 118. The processing module 118 can execute several searches, including but not limited to, a general search and a vertical search. To that end, the processing module 118 comprises (or has access to) a web search module 120. The web search module 120 is configured to perform general web searches, as is known to those of skill in the art.

The web search module 120 can have access to a web database 130, which web database 130 can be accessed by the web search module 120 to conduct a search. Even though the web database 130 is depicted as a single entity, in some non-limiting embodiments of the present technology, the web database 130 can be implemented in a distributed manner, for example as a dedicated database for each of the middle level meta search and the bottom level search.

Also, even though the web search module 120 is depicted as a single entity, in alternative non-limiting embodiments of the present technology the web search module 120 can also be implemented in a distributed manner. For example, each of the distributed implementations of the web search modules 120 can be dedicated to search queries originating from a particular geographical region. In those non-limiting embodiments of the present technology, the processing module 120 may determine a location and/or an IP address associated with the electronic device 102 associated with the user who is submitting the search query. Based on the so-determined location and/or the IP address of the electronic device 102, the processing module 118 may forward the search query to one of the distributed web search modules 120 to perform the top level meta search.

The processing module 118 further comprises (or has access to) a vertical search module 122, which can be also a plurality of vertical search modules. It should be expressly understood that the number of modules within the plurality of vertical search modules is not meant to be a limitation of embodiments of the present technology.

Merely for the purposes of ease of illustration, it shall be assumed that the vertical search module 122 is implemented as a images vertical search domain. As such, it can be said that the vertical search module 122 implements an image vertical search engine or, simply, an image service.

In some non-limiting embodiments of the present technology, any one of the plurality of vertical search modules comprises or has access to one or more databases. These one or more databases host data associated with the particular service implemented by the given one of the plurality of vertical search modules.

To that extent, the vertical search module 122 has access to a vertical database 132. Recalling that the vertical search module 122 implements an image service, the vertical database 132 can host a repository of various images.

Also, for the purposes of the description presented herein, the term "vertical" (as in vertical search or in vertical search domain) is meant to connote a search performed on a subset of a larger set of data, the subset having been grouped pursuant to an attribute of data. For example, to the extent that the vertical search module 122 implements an image service, the vertical search module 122 searches a subset (i.e. images) of the set of data (i.e. all the data potentially available for searching), the subset of data being stored in the vertical 132.

The system 100 further comprises a targeted messages cluster 124. In the depicted embodiment, the targeted messages cluster 124 is coupled to the server 114 via a dedicated communication link (not depicted). Alternatively, the targeted messages cluster 124 is coupled to the server 114 via the communications network 112. The targeted messages cluster 124 has access to (or, otherwise, comprises) a targeted messages database 134.

In alternative embodiments of the present technology, the functionality of the targeted messages cluster 124 can be executed on the server 114. In other alternative embodiments of the present technology, the functionality of the targeted messages cluster 124 can be executed on search cluster 116. Yet in further embodiments, functionality of the server 114, the search cluster 116 and the targeted messages cluster 124 can be executed on a single computing apparatus (not depicted).

As an example, let it be assumed that the user 140 is desirous of executing a web search. It should be understood that the user 140 is just an example of a plurality of users potentially desirous of using search engine services provided by the server 114. While only a single instance of the user 140 has been shown, the system 100 supports a large number of concurrent users similar to the user 140 using the search engine service provided by the server 114. As such, a plurality of electronic devices (similar or different to the electronic device 102) can be connected to the server 114 and the server 114 is configured to process a plurality of search queries received from the plurality of users substantially concurrently.

The server 114 is responsible for receiving a search query submitted by the electronic device 102. In some embodiments, the search query received from the electronic device comprises inter alia a user ID that identifies either the user himself or the electronic device 102, or both. How the server 114 processes the search query to determine search results is generally known in the art. However, briefly, the server 114 transmits the query to the search cluster 116. The processing module 118 of the search cluster 116 communicates with the web search module 120 and the vertical search module 122 to determine a plurality of web resources that are relevant (i.e. responsive) to user's search query. As a person skilled in the art will understand, in some implementations, the processing module 118 may communicate exclusively with the web search module 120, and not with the vertical search module 122, and vice versa. In other implementations, there can be more than one vertical search modules similar to the vertical search module 122. For example, these other vertical search modules may include: a video vertical search module, a maps vertical search module, a news vertical search module and the like.

The web database 130 stores an index of various websites, including index of various documents stored thereon. Alternately, or in addition, the web database 130 stores the actual documents from different websites. "Documents" are to be understood to include any form of indexable content, including textual documents in any text or graphics format, images, video, audio, multimedia, presentations, and so forth.

The vertical database 132, being in this particular implementation an image vertical database, stores an index of image documents stored on various websites. Alternately, or in addition, the vertical database 132, being in this particular implementation an image vertical database, stores the actual image documents indexed (and/or retrieved) from different websites. Naturally, in other implementations, the vertical database 132 can be any other vertical database containing respective indexed content (such as video content, news content, maps content and the like) and corresponding index, or corresponding index only.

The targeted messages cluster 124 is responsible for providing a set of targeted messages to the server 114 for inclusion within the search engine result page. The targeted messages cluster 124 selects the targeted messages in response to the search query received from the server 114 based at least in part on the search query and/or on the identity of the user performing the search query. The identity of the user, received for example as the user ID as part of the query, can enable the targeted messages cluster 124 to determine a user profile (or a user profile associated with a group of similar user to the user 140) to select the appropriate targeted message for the user 140. How the targeted message is actually selected is well known in the art and, as such, will not be described here at any length.

In some embodiments of the present technology, the targeted messages cluster 124 generates a targeted messages set for a particular search query. The targeted messages cluster 124 is configured to group the set of targeted messages from the targeted messages set into the first plurality of targeted messages and the second plurality of targeted messages containing distinct targeted messages based on a targeting parameter. In some embodiments, the process of grouping of targeted messages is executed at the time after the search query is received. In other embodiments, the process of grouping of targeted messages is executed at the time before the search query is received.

The so-grouped targeted messages are stored in the targeted message database 134. In some embodiments, the targeted message database 134 further stores additional information associated with each (or some) of the targeted messages. The information related to the targeted messages can include data about the targeted message publisher, the associated prices, historical click through rate of the particular targeted message, hypothetical click through rate of the particular targeted message, etc.

Needless to say, in some implementations of the present technology, the so-grouped targeted messages can be stored at a location other than the targeted message database 134.

The targeted messages cluster 124 selects the targeted messages and groups the selected targeted messages into the first plurality of targeted messages and the second plurality of targeted messages containing distinct targeted messages based on a targeting parameter. The server 114 generates then the search engine result page by combining the search query result set with the targeted messages from one of the pluralities of targeted messages, and returns the search engine result page via communications network 112 to the electronic device 102 for displaying to the user 140. The targeting parameter can be an actual click-through rate of the targeted message, or a predicted click-through rate of the targeted message, or a bid price associated with the targeted message, or combination of some of these targeting parameters. The list of targeting parameters presented here as an example is not exhaustive: other parameters are possible.

The server 114 selects the targeted messages by executing the steps of: responsive to the relevance factor of the search query result set being equal or exceeding the threshold, selecting the targeted message from a first plurality of targeted messages; responsive to the relevance factor of the search query result set being below the threshold, selecting the targeted message from a second plurality of targeted messages.

However, in some implementations of the present technology, the server 114 can select targeted messages to be included into the search engine result page from more than one plurality of targeted messages. For example, the server 114 can select a targeted message from the first plurality of targeted messages for displaying in the first spatial placement within the search engine result page, and select another targeted message from the second plurality of targeted messages for displaying in the second spatial placement within the search engine result page. Within these embodiments, the server 114 can selected the spatial placement as follows. Responsive to the targeting parameter factor being one of: equal to a threshold and above the threshold, the server 114 can select the first spatial placement of the targeted message in the search engine result page. On the other hand, responsive to the targeting parameter factor being below the threshold, the server 114 can select the second spatial placement of the targeted message in the search engine result page.

Non-limiting examples of the threshold for the targeting parameter include: a bid price for cost-per-click targeting parameter, for example 0.22 USD; a threshold expressed as a percentage for click-through rate targeting parameter, for example 1.3 percent; a distance in miles for distance targeting parameter, for example 8 miles; etc. Threshold for the targeting parameter can also be an abstract numeric value. Such an abstract numeric value can be used in those implementations, where the targeting parameter is a combination of several targeting parameters, represented as a numeric value and, hence, the targeting parameters threshold can also be calculated using the abstract numeric value.

Examples of selection of the spatial placement include: selection a first spatial placement on the top of the search engine result page for targeted messages selected from the first plurality of targeted messages, and selection a second spatial placement on the bottom of the search engine result page for targeted messages selected from the second plurality of targeted message; selection a first spatial placement in the middle of the search engine result page for targeted messages selected from the first plurality of targeted messages, and selection a second spatial placement on the right side of the search engine result page for targeted messages selected from the second plurality of targeted message; etc.

FIG. 2A illustrates combined user input and output interfaces, the input interface for receiving user inputs, and user output interface for providing at least one of visual and audible outputs to the user. More specifically, within the illustration of FIG. 2A, there is depicted a screen shot of the above mentioned search application 104 executed on the electronic device 102 having the web browser interface 106. The portion of the screen shot of the browser interface 106 depicted in FIG. 2A is separated into two areas: a user interfacing area 213, and a search engine result page 216.

In this particular implementation, the web browser interface 106 is a Yandex™ web browser interface, displayed on the display screen of the electronic device 102 (the electronic device 102 being Lenovo desktop with a Core 2 Duo 2.2 GHz processor 22 running Windows XP with 2 GB of RAM). In other implementations of the present technology, the web browser interface 106 can be any browser interfaces of any search engine, and the electronic device 102 can be any suitable electronic device.

The web browser interface 106, and more specifically the user interfacing area 213, comprises the aforementioned omnibox 108. In the depicted implementation of the present technology, the omnibox 108 comprises combined address and search bar, where the user 140 can enter a search query 212 directly into combined address and search bar.

In alternative implementations of the present technology, the omnibox 108 is an address bar where the user 140 cannot enter a search query. To perform a search, the user 140 can enter a uniform resources locator (URL) of a search services provider, for example, www.google.com, and then enter a search query into the search bar 214, the search bar 214 displayed on the web page of the search services provider.

Figure 2B:
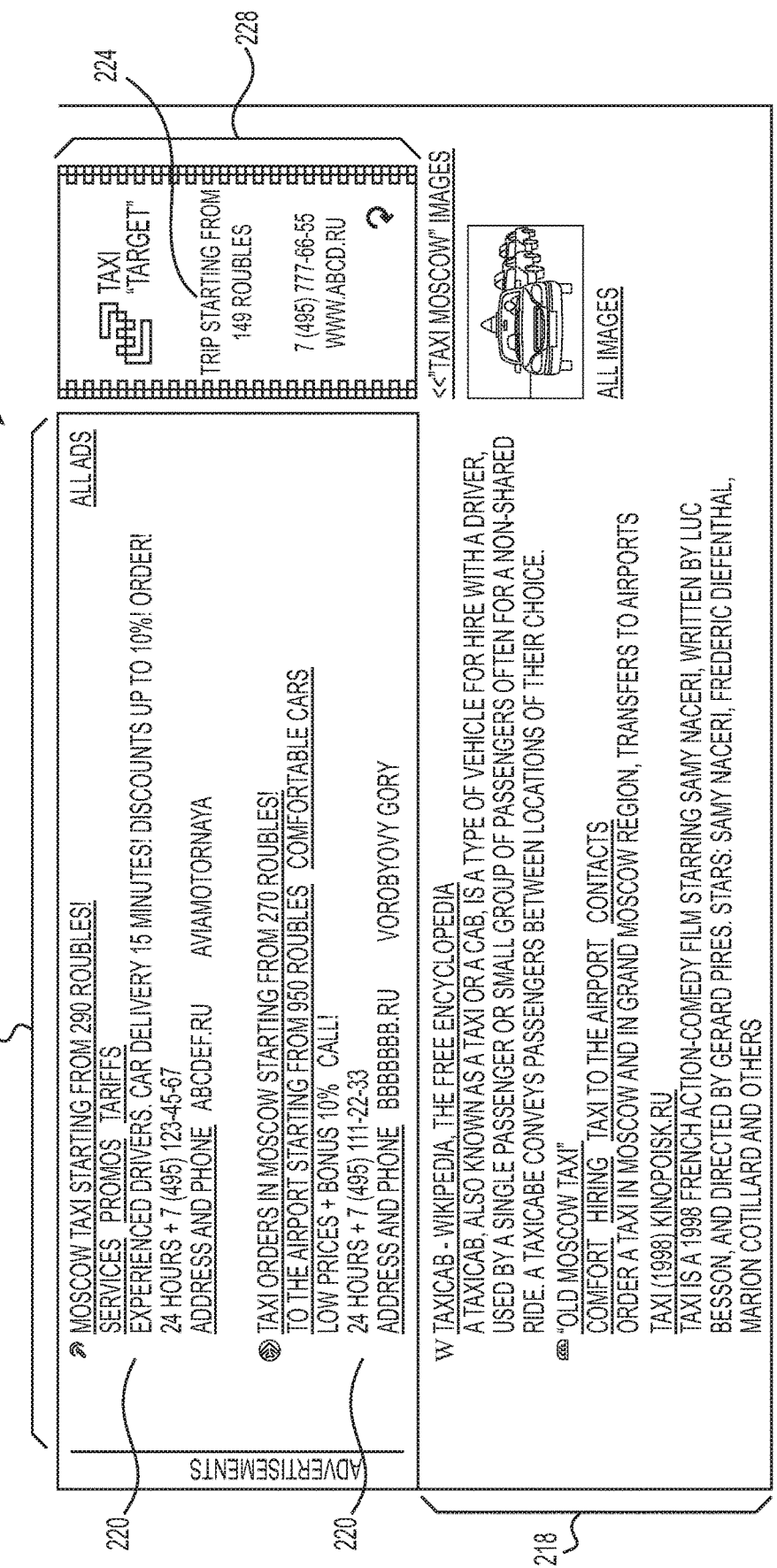
FIG. 2B illustrates the search engine result page 216 being a portion of the web browser interface 106 being a combined user input interface and user output interface illustrated in FIG. 2A.

With additional reference to FIG. 2B, which illustrates the search engine result page 216 in greater detail, the process for generating search engine result page 216 will be described in greater detail. Responsive to the receiving the search query 212 from the user 140, the electronic device 102 sends the search query 212 over the communication network 112 to the server 114. Responsive to the receiving the search query 212 from the electronic device 102, the server 114 transmits the search engine result page 216 in any suitable format, for example in JSON format, over a communication network 112 to the electronic device 102 for displaying on the display screen of the electronic device 102.

The search engine result page 216 comprises a search query result set 218, a first targeted message 220, a second targeted message 222, and a third targeted message 224, the first targeted message 220 and the second targeted message 222 are located in the first spatial placement 226, and the third targeted message 224 is located in the second spatial placement 228.

Figure 3:
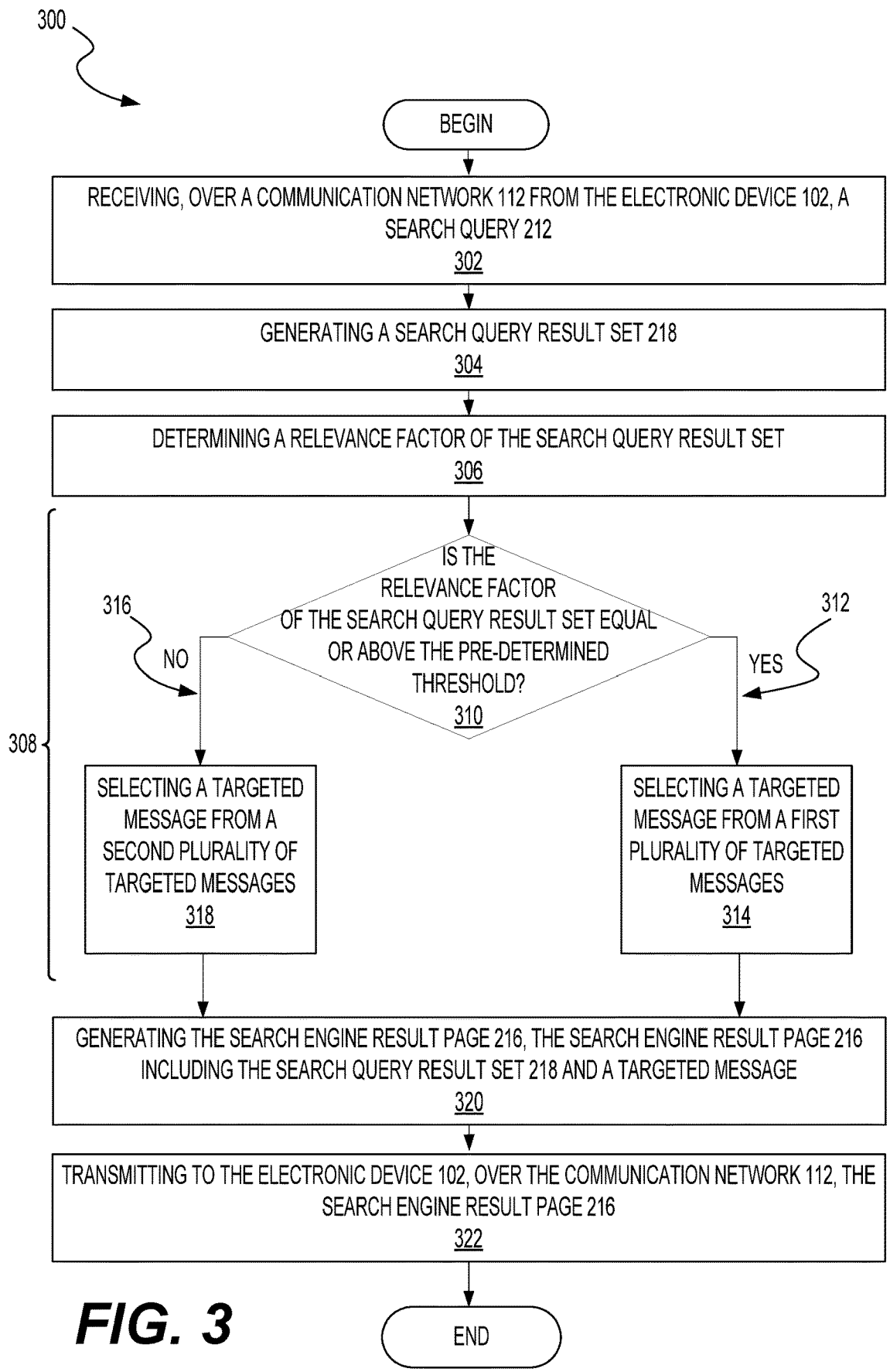
FIG. 3 is a block diagram showing a computer-implemented method of presenting a search engine result page to a user on the electronic device, the method executable at the server of the system 100 of FIG. 1.

FIG. 3 illustrates a computer-implemented method 300 of presenting a search engine result page 216 to the user 140 on the electronic device 102, the electronic device 102 having the search application 104, the method executable at the server 114.

At step 302, the server 114 receives, over the communications network 112 from the electronic device 102, the electronic device 102 having a search application 104, a search query.

At step 304, the server 114, responsive to the search query, generates a search query result set 218.

In this example of an implementation of the present technology, the "search query result set" is a listing of results returned by the server 114. The listing of results returned by the server 114 can contain a listing of results returned by the web search module 120 (also known as general web search results), or by the vertical search module 122 (also known as the vertical search results), or by combination of results returned by web search module 120 and the vertical search module 122.

As has been alluded to before, the search cluster 116 performs the search and returns a ranked query search result set. The ranked search query result set can include the combination of the general search results and the vertical search results (or multiple vertical searches results) or, put another way, a search query result set from at least one of the plurality of vertical search modules. The search query result set can also contain no result. For example, this can be in the case where no matching documents where found in response to a search query.

At step 306, the server 114 determines a relevance factor of the search query result set 218 based on the search query. For the purposes of this description the term "relevance factor of the search query result set" shall mean the likelihood that the search query result set will satisfy the user's search intent. Methods of determination of the relevance factor of the search query result set in this implementation of the present technology are based on machine learning techniques. For the sake of example and not a limitation, relevance factor of a search query result set 218 may be determined based on past user's interactions with a search query result set previously generated in response to the same or substantially similar search queries. More specifically, by observing prior interactions of other users with similar or substantially similar search results, the server 114 can determine how likely the search query result set is to satisfy this user's 140 search intent.

At step 308, the server 114 selects the targeted message. To execute the selection, the server 114 determines at a sub step 310 whether the relevance factor of the search query result set 118 is equal, above or below a threshold. If the server 114 determines that the relevance factor of the search query result set 118 is equal or exceeds the threshold (sub step 312), the server 114 selects the targeted message from the first plurality of targeted messages (sub step 314). If the server 114 determines that the relevance factor of the search query result set 118 is below the threshold (sub step 316), the server 114 selects the targeted message from the second plurality of targeted messages (sub step 318).

In this example of an implementation of the present technology, the threshold for the relevance factor of the search query result set 118 can be pre-determined by the server 114. In some implementations, the threshold can be the same with regard to any search query results set. In other examples of the present technology, different thresholds for the relevance factor of the search query result can be pre-determined for different categories of the search queries in response to which the search query result sets were generated.

For example, a first threshold may be pre-determined for search queries related to cars, like "Jaguar 3.4 litre", "used cars", "1995 eagle talon" and the like; a second threshold may be pre-determined for search queries related to fast food, like "pizza", "sushi delivery" and the like; and a third threshold may be established for all other search queries, including search queries like "jaguar population", "litre gallon conversion", "train car wallpaper" etc.

At step 320, the server 114 generates the search engine result page 216, the search engine result page 216 including the search query result set 218, the search query result set 218 generated at step 304, and a targeted message, the targeted message selected at step 308, sub steps 310, 316 and 318, or the targeted message selected at steps 308, sub steps 310, 312 and 314.

At step 322, the server 114 transmits to the electronic device 102, over the communications network 112, the search engine result page 216.

The execution of the method 300 then terminates.

Figure 4:
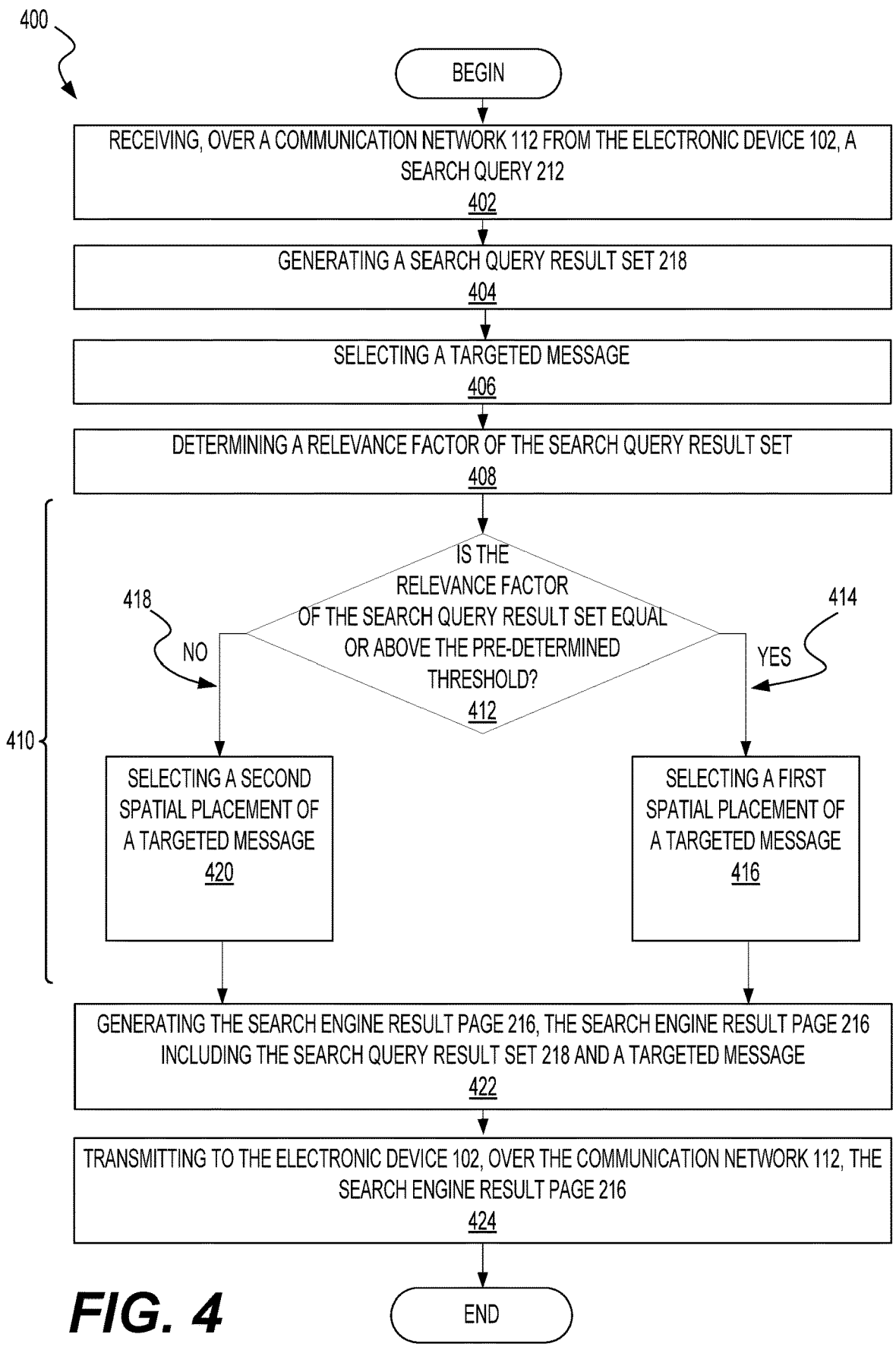
FIG. 4 is a block diagram showing another implementation of computer-implemented method of presenting the search engine result page to the user on the electronic device.

FIG. 4 illustrates a computer-implemented method 400 of presenting a search engine result page 216 to the user 140 on the electronic device 102, the electronic device 102 having the search application 104, the method 400 executable at the server 114. The method 400 is implemented in accordance with another non-limiting embodiment of the present technology.

At step 402, the server 114 receives, over the communications network 112 from the electronic device 102, the electronic device 102 having a search application 104, a search query.

At step 404, the server 114, responsive to the search query, generates a search query result set 218.

In this example of an implementation of the present technology, the "search query result set" is a listing of results returned by the server 114. The listing of results returned by the server 114 can contain a listing of results returned by the web search module 120 (also known as general web search results), or by the vertical search module 122 (also known as the vertical search results), or by combination of results returned by web search module 120 and the vertical search module 122.

As has been alluded to before, the search cluster 116 performs the search and returns a ranked query search result set. The ranked search query result set can include the combination of the general search results and the vertical search results (or multiple vertical searches results) or, put another way, a search query result set from at least one of the plurality of vertical search modules. The search query result set can also contain no result. For example, this can be in the case where no matching documents where found in response to a search query.

At step 406, the server 114 selects a targeted message to be displayed within the search engine result page 216.

At step 408, the server 114 determines a relevance factor of the search query result set 218 based on the search query. For the purposes of this description the term "relevance factor of the search query result set" shall mean the likelihood that the search query result set will satisfy the user's search intent. Methods of determination of the relevance factor of the search query result set in this implementation of the present technology are based on machine learning techniques. For the sake of example and not a limitation, relevance factor of a search query result set 218 may be determined based on past user's interactions with a search query result set previously generated in response to the same or substantially similar search queries. More specifically, by observing prior interactions of other users with similar or substantially similar search results, the server 114 can determine how likely the search query result set is to satisfy this user's 140 search intent.

At step 410, the server 114 determines a spatial placement of the targeted message. To execute the selection, the server determines at sub step 412 whether the relevance factor of the search query result is equal, above or below a threshold. If the server 114 determines that the relevance factor of the search query result set 218 is equal or exceeds the threshold (sub step 414), the server 114 selects a first spatial placement (sub step 416). If the server 114 determines that the relevance factor of the search query result set is below the threshold (sub step 418), the server 114 selects a second spatial placement (sub step 420).

In this example of an implementation of the present technology, the threshold for the relevance factor of the search query result set 118 can be pre-determined by the server 114. In some implementations, the threshold can be the same with regard to any search query results set. In other examples of the present technology, different thresholds for the relevance factor of the search query result can be pre-determined for different categories of the search queries in response to which the search query result sets were generated. For example, a first threshold may be pre-determined for search queries related to cars, like "Jaguar 3.4 litre", "used cars", "1995 eagle talon" and the like; a second threshold may be pre-determined for search queries related to fast food, like "pizza", "sushi delivery" and the like; and a third threshold may be established for all other search queries, including search queries like "jaguar population", "litre gallon conversion", "train car wallpaper" etc.

At step 422, the server 114 generates the search engine result page 216, the search engine result page 216 including the search query result set 218, the search query result set 218 generated at step 404, and a targeted message, the targeted message selected at step 406, the spatial placement of the targeted message is determined at steps 410, 412, 414 and 416 or the targeted message selected at steps 410, 412, 418 and 420.

At step 424, the server 114 transmits to the electronic device 102, over the communications network 112, the search engine result page 216.

The execution of the method 400 then terminates.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of presenting a search engine result page to a user on an electronic device, the method executable at a server, the server executing a machine learning algorithm (MLA), the method comprising:

executing, prior to selecting a targeted message:

receiving, over a communication network from the electronic device, a search query, the search query being associated with a user search intent, wherein the search query is of one of a plurality of search query categories, wherein:

each one of the plurality of search query categories has been associated with a respective plurality of search queries; and each one of the plurality of search query categories having been assigned with a respective one of a plurality of relevancy thresholds, each one of the plurality of relevancy thresholds having been predetermined for each one of the plurality of search query categories;

responsive to the search query, generating a search query result set, the generating the search query result set including ranking a plurality of search results based on an individual relevance of each search result of the plurality of search results to the search query;

based on previous interactions of other users with search engine result pages containing the plurality of search results generated in response to a previous search query that is at least substantially similar to the search query, determining, by the MLA, a relevance factor of the search query result set as a whole, the relevance factor of the whole search query result set indicative of a likelihood parameter that the whole search query result set satisfies the user search intent associated with the search query, the relevance factor of the whole search query result set being determined after every search result in the search query result set has been ranked, the relevance factor being determined independently from the individual relevance of each search result within the plurality of search results of the search query result set to the search query;

generating, in response to the search query being of the one of the plurality of search query categories, the search engine result page, the search engine result page including the search query result set;

selecting, by the server, the targeted message, and executing thereafter:

determining, by the server, a spatial placement of the targeted message by executing the steps of:

responsive to the relevance factor of the search query result set as a whole being one of: equal to a respective one of the plurality of relevancy thresholds and above the respective one of the plurality of relevancy thresholds, selecting a first spatial placement of the targeted message in the search engine result page, the first spatial placement being one of: a top of the search engine result page, and a middle of the search engine result page;

responsive to the relevance factor of the search query result set as a whole being below the respective one of the plurality of relevancy thresholds, selecting a second spatial placement of the targeted message in the search engine result page, the second spatial placement being one of: a bottom of the search engine result page, and a right side of the search engine result page;

including the targeted message within the search engine result page at the spatial placement, transmitting to the electronic device, over the communication network, the search engine result page, the transmitting causing the electronic device to display, on a display screen of the electronic device, the search engine result page.

2. The method of claim 1, wherein the selecting, by the server, the targeted message further comprises executing the steps of:

responsive to a targeting parameter factor being one of: equal to a targeting parameter threshold and above the targeting parameter threshold, selecting the targeted message from a first plurality of targeted messages;

responsive to the targeting parameter factor being below the targeting parameter threshold, selecting the targeted message from a second plurality of targeted messages;

the first plurality of targeted messages and the second plurality of targeted messages containing distinct targeted messages that have been grouped in accordance with at least one common targeting parameter.

3. The method of claim 1, wherein the selecting, by the server, the targeted message further comprises executing the steps of:

responsive to the relevance factor of the search query result set as a whole being one of: equal to the respective one of the plurality of relevancy thresholds and above the respective one of the plurality of relevancy thresholds, selecting the targeted message from a first plurality of targeted messages;

responsive to the relevance factor of the search query result set as a whole being below the respective one of the plurality of relevancy thresholds, selecting the targeted message from a second plurality of targeted messages;

the first plurality of targeted messages and the second plurality of targeted messages containing distinct targeted messages that have been grouped in accordance with at least one common targeting parameter.

4. The method of claim 1, further comprising calculating the respective one of the plurality of relevancy thresholds.

5. The method of claim 1, wherein the targeted message comprises a digital ad.

6. The method of claim 1, wherein the targeting parameter comprises an actual click-through rate of the targeted message.

7. The method of claim 1, wherein the targeting parameter comprises a predicted click-through rate of the targeted message.

8. The method of claim 1, wherein the targeting parameter comprises a bid price associated with the targeted message.

9. A computer-implemented method of presenting a search engine result page to a user on an electronic device, the method executable at a server, the server executing a machine learning algorithm (MLA), the method comprising:

executing, prior to selecting a targeted message:

receiving, over a communication network from the electronic device, a search query, the search query associated with a user search intent, wherein the search query is of one of a plurality of search query categories, wherein:

each one of the plurality of search query categories has been associated with a respective plurality of search queries; and each one of the plurality of search query categories having been assigned to a respective one of a plurality of relevancy thresholds, each one of the plurality of relevancy thresholds having been predetermined for each one of the plurality of search query categories;

responsive to the search query, generating a search query result set, the generating the search query result set including ranking a plurality of search results based on an individual relevance of each search result of the plurality of search results to the search query;

based on previous interactions of other users with search engine result pages containing the plurality of search results generated in response to a previous search query that is at least substantially similar to the search query, determining, by the MLA, a relevance factor of the search query result set as a whole, the relevance factor of the whole search query result set indicative of a likelihood parameter that the whole search query result set satisfies the user search intent associated with the search query, the relevance factor of the whole search query result set being determined after every search result in the search query result set has been ranked, the relevance factor being determined independently from the individual relevance of each search result within the plurality of search results of the search query result set to the search query;

generating, in response to the search query being of the one of the plurality of search query categories, the search engine result page, the search engine result page including the search query result set;

selecting, by the server, the targeted message by executing the steps of:
responsive to the relevance factor of the search query result set as a whole being one of: equal to a respective one of the plurality of relevancy thresholds and above the respective one of the plurality of relevancy thresholds, selecting the targeted message from a first plurality of targeted messages;
responsive to the relevance factor of the search query result set as a whole being below the respective one of the plurality of relevancy threshold, selecting the targeted message from a second plurality of targeted messages;
the first plurality of targeted messages and the second plurality of targeted messages containing distinct targeted messages that have been grouped in accordance with a targeting parameter;

executing after the selecting the targeted message:
determining, by the server, a spatial placement of the targeted message within the search engine result page;
including the targeted message within the search engine result page at the spatial placement;
transmitting to the electronic device, over the communication network, the search engine result page, the transmitting causing the electronic device to display, on a display screen of the electronic device, the search engine result page.

10. The method of claim 9, wherein the determining, by the server, the spatial placement of the targeted message further comprises executing, after the selecting the targeted message, the steps of:

responsive to the targeting parameter factor being one of: equal to a targeting parameter threshold and above the targeting parameter threshold, selecting a first spatial placement of the targeted message in the search engine result page, the first spatial placement being one of: a top of the search engine result page, and a middle of the search engine result page;
responsive to the targeting parameter factor being below the targeting parameter threshold, selecting a second spatial placement of the targeted message in the search engine result page, the second spatial placement being one of: a bottom of the search engine result page, and a right side of the search engine result page.

11. The method of claim 9, wherein the determining by the server, the spatial placement of the targeted message further comprises executing, after the selecting the targeted message, the steps of:

responsive to the relevance factor of the search query result set as a whole being one of: equal to the respective one of the plurality of relevancy thresholds and above the respective one of the plurality of relevancy thresholds, selecting a first spatial placement of the targeted message in the search engine result page, the first spatial placement being one of: a top of the search engine result page, and a middle of the search engine result page;
responsive to the relevance factor of the search query result set as a whole being below the respective one of the plurality of relevancy thresholds, selecting a second spatial placement of the targeted message in the search engine result page, the second spatial placement being one of: a bottom of the search engine result page, and a right side of the search engine result page.

12. The method of claim 9, further comprising calculating the respective one of the plurality of relevancy thresholds.

13. The method of claim 9, wherein the targeted message comprises a digital ad.

14. The method of claim 9, wherein the targeting parameter comprises an actual click-through rate of the targeted message.

15. The method of claim 9, wherein the targeting parameter comprises a predicted click-through rate of the targeted message.

16. The method of claim 9, wherein the targeting parameter comprises a bid price associated with the targeted message.

* * * * *